(12) United States Patent
Shimizu

(10) Patent No.: US 12,214,653 B2
(45) Date of Patent: Feb. 4, 2025

(54) VEHICLE INCLUDING AIR INFLOW ADJUSTMENT MECHANISM

(71) Applicant: SUBARU CORPORATION, Tokyo (JP)

(72) Inventor: Satoshi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 327 days.

(21) Appl. No.: 17/947,554

(22) Filed: Sep. 19, 2022

(65) Prior Publication Data

US 2023/0096296 A1    Mar. 30, 2023

(30) Foreign Application Priority Data

Sep. 27, 2021    (JP) .................. 2021-156975

(51) Int. Cl.
*B60K 11/08* (2006.01)
*B60H 1/32* (2006.01)
*B60K 11/04* (2006.01)
*B60R 19/52* (2006.01)

(52) U.S. Cl.
CPC .............. *B60K 11/08* (2013.01); *B60H 1/32* (2013.01); *B60K 11/04* (2013.01); *B60R 19/52* (2013.01)

(58) Field of Classification Search
CPC ....... B60K 11/08; B60K 11/04; B60K 11/085; B60H 1/32; B60H 1/3227; B60H 1/00485; B60R 19/52; Y02T 10/88
See application file for complete search history.

(56) References Cited

U.S. PATENT DOCUMENTS

| 10,857,872 | B2 * | 12/2020 | Sedlak | B60K 11/085 |
| 11,434,809 | B2 * | 9/2022 | Taneoka | B60K 11/085 |
| 2013/0223980 | A1 * | 8/2013 | Pastrick | F01D 5/00 |
| | | | | 415/1 |

FOREIGN PATENT DOCUMENTS

| CN | 105365905 A | * | 3/2016 |
| CN | 215052533 U | * | 12/2021 |
| JP | 2010208482 A | * | 9/2010 |
| JP | 2011031842 A | * | 2/2011 |
| JP | 2012001112 A | * | 1/2012 |
| TW | I706497 B | * | 10/2020 |

* cited by examiner

*Primary Examiner* — James A Shriver, II
*Assistant Examiner* — Michael T. Walsh
(74) *Attorney, Agent, or Firm* — MCGINN I.P. LAW GROUP, PLLC

(57) ABSTRACT

A vehicle includes an outside-air intake and an air inflow adjustment mechanism. The outside-air intake is configured to take outside air into an internal chamber of the vehicle. The air inflow adjustment mechanism is configured to adjust a flow rate of air that is to flow into the outside-air intake. The air inflow adjustment mechanism is disposed at the outside-air intake and includes one or both of a positive pressure source configured to perform discharge of gas and a negative pressure source configured to perform suction of gas.

5 Claims, 8 Drawing Sheets

VEHICLE INCLUDING AIR INFLOW ADJUSTMENT MECHANISM

CROSS-REFERENCE TO RELATED APPLICATIONS

The present application claims priority from Japanese Patent Application No. 2021-156975 filed on Sep. 27, 2021, the entire contents of which are hereby incorporated by reference.

BACKGROUND

The disclosure relates to a vehicle including an air inflow adjustment mechanism for air that flows into an outside-air intake provided at the front of a vehicle body.

Vehicles in general include outside-air intakes at a front grille or the like at the front of a vehicle. While a vehicle is running, heat exchangers, such as a radiator and a condenser, are cooled by introducing running wind, which is generated as a result of the vehicle running, into an engine compartment through an outside-air intake.

As a technique for controlling the flow rate of running wind that is taken in through the above-mentioned outside-air intake, an active shutter is known, and examples of the active shutter are described in Japanese Unexamined Patent Application Publication (JP-A) No. 2011-031842, JP-A No. 2012-001112, and JP-A No. 2010-208482. Such an active shutter is disposed, for example, on a front grille or between the front grille and a heat exchanger and performs opening and closing operations in accordance with the vehicle speed, the temperature of cooling water, or the like so as to control the flow rate of the air that flows through the outside-air intake.

SUMMARY

An aspect of the disclosure provides a vehicle including an outside-air intake and an air inflow adjustment mechanism. The outside-air intake is configured to take outside air into an internal chamber of the vehicle. The air inflow adjustment mechanism is configured to adjust a flow rate of air that is to flow into the outside-air intake. The air inflow adjustment mechanism is disposed at the outside-air intake and includes one or both of a positive pressure source configured to perform discharge of gas and a negative pressure source configured to perform suction of gas.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

It does not seem that the recent techniques including those described in JP-A No. 2011-031842, JP-A No. 2012-001112, and JP-A No. 2010-208482 properly meet market needs, and there have been the following problems.

For example, in JP-A No. 2011-031842, JP-A No. 2012-001112, and JP-A No. 2010-208482, the flow rate of running wind that flows through an outside-air intake is adjusted by using a shutter serving as a movable member. Accordingly, an open/close mechanism for opening and closing the shutter is provided, and the open/close mechanism is to be controlled, so that the costs increase.

Since the shutter and the open/close mechanism, such as a drive motor, are additionally provided in the vicinity of a front grille, the weight of the front of a vehicle relatively increases, and this does not always have a positive effect on the weight balance between the front and the rear of the vehicle.

It is desirable to provide a vehicle including an air inflow adjustment mechanism that is capable of adjusting the inflow of air that flows into an outside-air intake while relatively suppressing an increase in costs and an increase in weight.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle according to the embodiment of the disclosure includes an air inflow adjustment mechanism. For a common configuration of a vehicle excluding the configurations that will be described in detail below, for example, a known vehicle structure including a front grille and an engine compartment disclosed in JP-A No. 2011-031842, JP-A No. 2012-001112, JP-A No. 2010-208482, and the like may be suitably employed as a complement.

<Vehicle 100>

Figure 1:
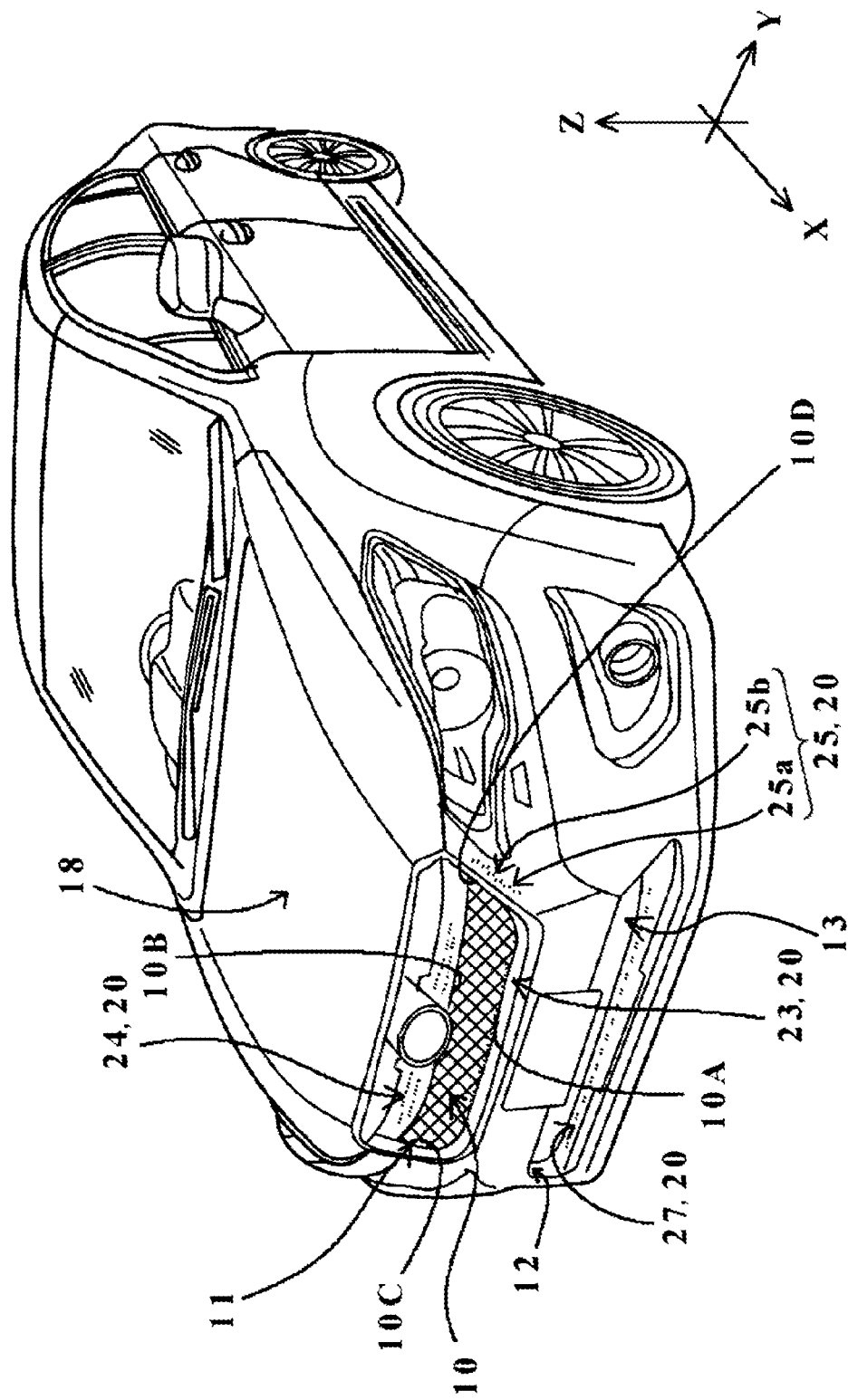
FIG. 1 is a schematic diagram illustrating a vehicle according to an embodiment that includes an air inflow adjustment mechanism.

FIG. 1 is a diagram schematically illustrating a vehicle 100 according to the present embodiment.

Note that, although a four-wheel vehicle with four tires will be described below as an example of the vehicle 100, the vehicle 100 of the present embodiment is not limited to a four-wheel vehicle, such as, for example, a bus or a car and is applicable to, for example, various known movable vehicles including a known two-wheel vehicle, such as a motorcycle.

It is understood from FIG. 1, FIG. 2, and the like that a front accommodation space AR (hereinafter also referred to as "internal chamber") that is an engine compartment in which an engine 19 is disposed is formed at the front of a vehicle body of the vehicle 100. A known bonnet (front hood) 18 that is freely openable and closable covers the front accommodation space AR from above.

Note that, as an example, a known reciprocating engine will be described below as the engine 19, the engine 19 that generates the power of the vehicle 100 is not limited to a reciprocating engine and may be, for example, another known engine, such as a turbine engine. In addition, a power mechanism of the vehicle 100 is not limited to the above-mentioned engine 19, and for example, another known power supply, such as an electric motor may be used instead of the engine 19. In other words, the vehicle 100 of the present embodiment is not limited to a gasoline-powered vehicle and may be, for example, an electric automobile including a hybrid vehicle.

Figure 2:
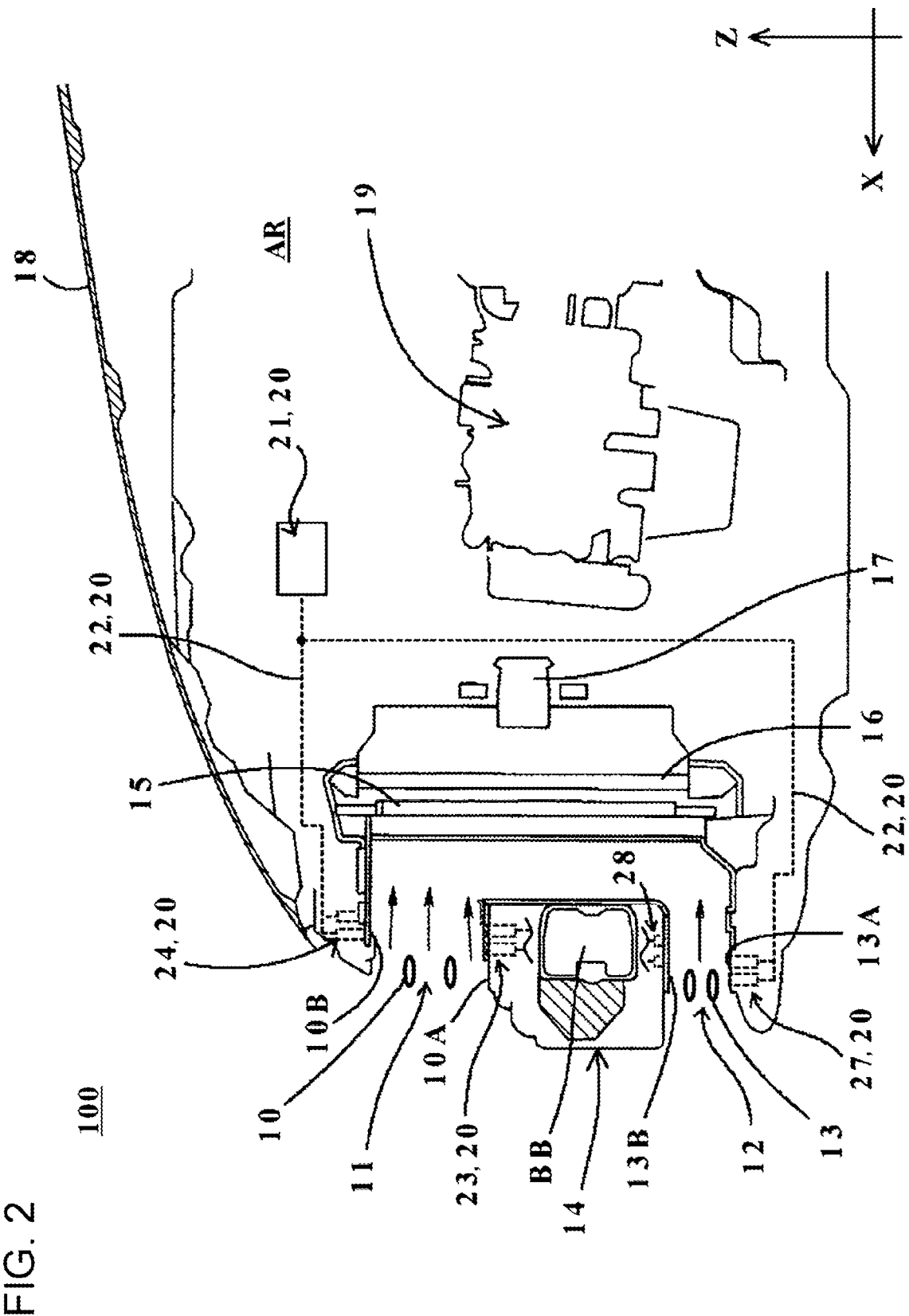
FIG. 2 is a schematic diagram illustrating a configuration of a front of the vehicle.

As is clear from FIG. 1 and FIG. 2, for example, a front grille 10 is disposed at a front end of the front accommodation space AR, which is also referred to as "engine compartment" and in which the engine 19 is accommodated, and positioned above a front bumper 14. An outside-air intake 11 is formed at the front of the vehicle 100 so as to take the outside air in via the front grille 10. Note that the structure of the front grille 10 is not particularly limited, and an example of the front grille 10 may be a known mesh or grid-shaped member.

A known radiator 16 that is used for, for example, cooling the above-mentioned engine 19 may be disposed in the front accommodation space AR that is positioned downstream from the outside-air intake 11 in the direction into which the outside air is taken. In addition, a known air-conditioning condenser 15 or the like may be disposed upstream from the radiator 16. Furthermore, for example, a known cooling fan 17 may be disposed downstream from the radiator 16. Note that the above arrangement of the air-conditioning condenser 15, the radiator 16, and the cooling fan 17 is an example, and another known arrangement example may be employed.

As mentioned above, the front bumper 14 that includes a known bumper beam BB is disposed below the front grille 10. In the present embodiment, a lower ventilation port 12 that communicates with the above-mentioned front accommodation space AR may be provided below the front bumper 14. A lower grille 13 is disposed in the lower ventilation port 12, and running wind may also be introduced into the front accommodation space AR through the lower grille 13. The specific structure of the lower grille 13 is not particularly limited, and a known mesh or grid-shaped structure similar to that of the above-mentioned front grille 10 may be employed.

<Air Inflow Adjustment Mechanism 20>

An air inflow adjustment mechanism 20 will now be described in detail also with reference to FIG. 3 to FIG. 5. It is understood from FIG. 3 to FIG. 5 that the air inflow adjustment mechanism 20 in the present embodiment is disposed at the outside-air intake 11 through which the outside air is taken into the above-mentioned front accommodation space AR (also referred to as "internal chamber"), and the air inflow adjustment mechanism 20 has a function of adjusting the flow rate of the running wind that flows into the outside-air intake 11.

Figure 3:
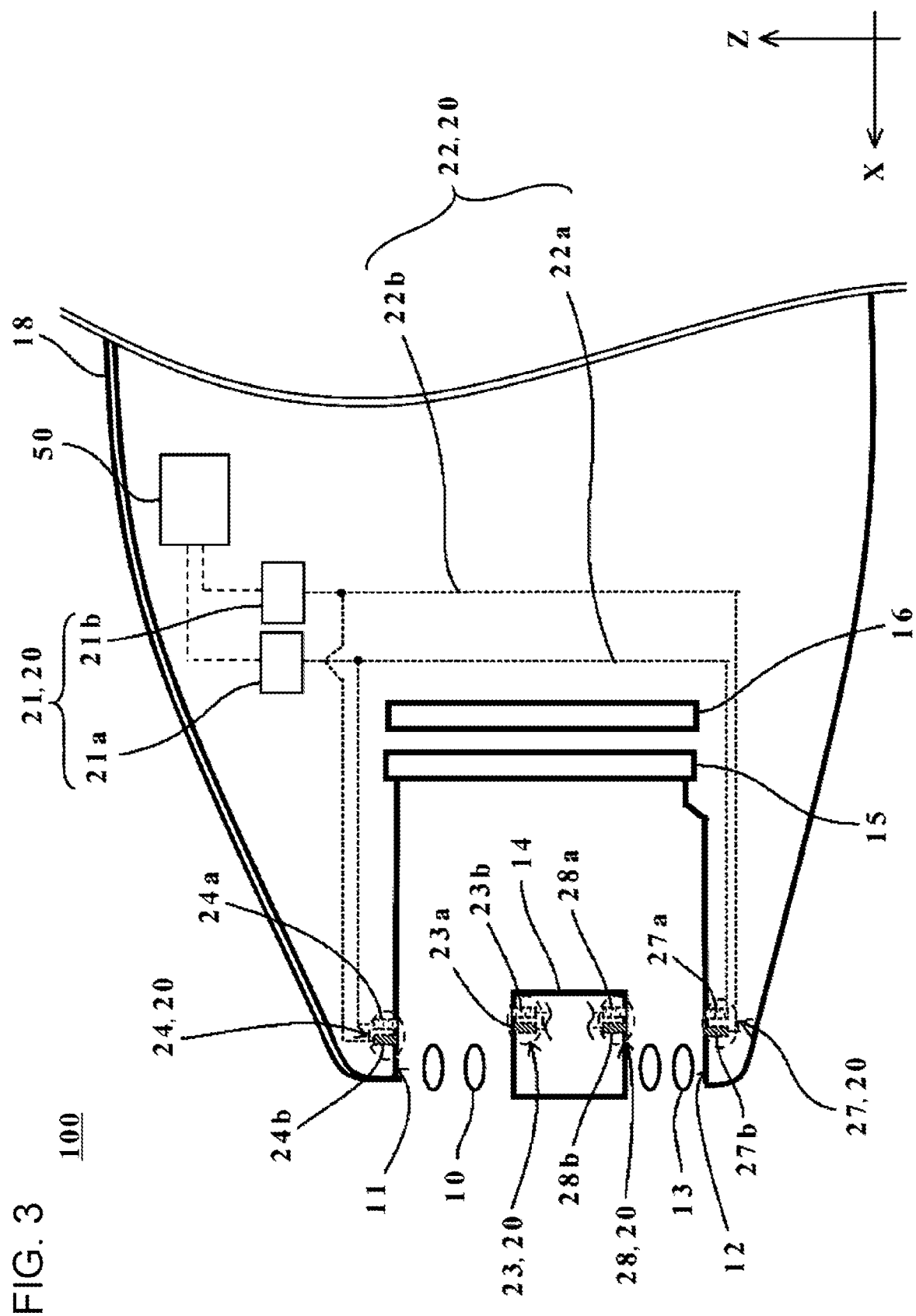
FIG. 3 is a schematic diagram illustrating details of the air inflow adjustment mechanism provided at the front of the vehicle.

As illustrated in FIG. 3 and the like, a control device 50 that is included in the vehicle 100 controls operations of the above-mentioned air inflow adjustment mechanism 20. The control device 50 may include one or more known electronic control units (ECUs). One or more of the functions of the control device 50 may be implemented by a known remote communication device that is provided outside the vehicle 100.

The air inflow adjustment mechanism 20 of the present embodiment includes a driving source 21 that can be coupled to gas passage holes that are formed in wall surfaces of the front grille 10, the wall surfaces forming the peripheral edge of the above-mentioned outside-air intake 11.

Note that the wall surfaces that are disposed around (at outer edges of) the front grille 10 may be included in the front grille 10 or may be formed separately from the front grille 10 by, for example, being included in the front bumper 14 or the bonnet 18 as illustrated in the drawings.

The driving source 21 of the present embodiment is disposed in the front accommodation space AR as an example and includes one or more of a positive pressure source 21a for discharging a gas from the above-mentioned gas passage holes and a negative pressure source 21b for drawing in a gas through the gas passage holes. The positive pressure source 21a is not particularly limited as long as it can discharge a gas, such as, for example, compressed air, and a specific example of the positive pressure source 21a may be a known air compressor that can be electrically coupled to a known battery included in the vehicle 100. The negative pressure source 21b is not particularly limited as long as it can generate a negative pressure through the gas passage holes, and specific examples of the negative pressure source 21b may be various known suction pumps that can be electrically coupled to the above-mentioned battery of the vehicle 100.

Figure 8:
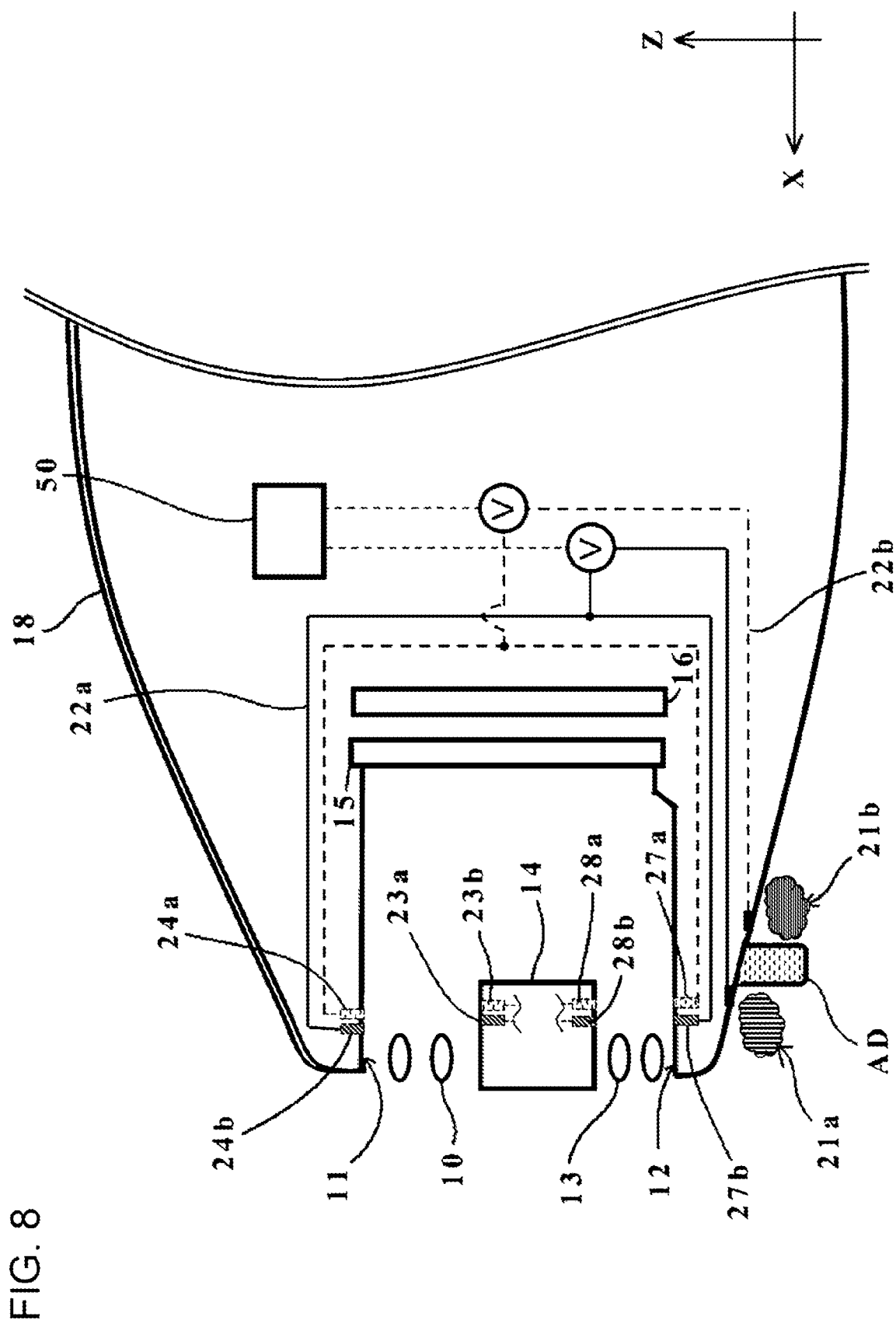
FIG. 8 is a schematic diagram illustrating another configuration of the front of the vehicle.

The positive pressure source 21a and the negative pressure source 21b may be formed in accordance with the shape of a vehicle body. In one example, as illustrated in FIG. 8, in the vehicle 100, a known air dam AD may be provided below the front bumper 14, and air vents may be formed in surfaces of the vehicle body on the upstream and downstream sides of the air dam AD. In other words, as illustrated in FIG. 8, the positive pressure source 21a and the negative pressure source 21b may be formed on the upstream side of the air dam AD and the downstream side of the air dam AD, respectively, and the air vents may be formed so as to communicate with their respective gas passage holes. The control device 50 may use known valves V so as to cause the air to flow from the positive pressure source 21a to the corresponding gas passage holes through the corresponding air vent and a positive pressure pipe 22a and so as to cause the air to be drawn into the negative pressure source 21b from the corresponding gas passage holes through the corresponding air vent and a negative pressure pipe 22b.

The above-mentioned positive pressure source 21a is coupled to gas discharge holes that are included in the gas passage holes by a known pipe 22 (positive pressure pipe 22a) through which the gas can flow. The above-mentioned negative pressure source 21b is coupled to gas suction holes that are included in the gas passage holes by another known pipe 22 (negative pressure pipe 22b) through which the gas can flow. Note that the positive pressure source 21a and the negative pressure source 21b are not necessarily provided as different pressure sources and may be provided as a single pressure source by, for example, using a known compressor/vacuum pump. One or more of the above-mentioned pipes 22 are disposed in the front accommodation space AR, in which the engine 19 serving as a heat source is accommodated, and thus, the pipes 22 may be made of one or more of various known piping materials having heat resistance, such as, for example, a metal and a heat-resistant resin.

In one example, the air inflow adjustment mechanism 20 of the present embodiment may have first gas passage holes 23 that are formed in a lower wall surface 10A of the front grille 10 provided with the above-mentioned outside-air intake 11. The first gas passage holes 23 are coupled to the above-mentioned driving source 21 (one or more of the positive pressure source 21a and the negative pressure source 21b) by the above-mentioned various pipes 22.

Note that, in the case where the lower wall surface 10A is included in the front grille 10 as mentioned above, the first gas passage holes 23 are formed in the lowermost end of the front grille 10, and in the case where the front grille 10 and the lower wall surface 10A are different members, for example, the first gas passage holes 23 may be formed in the upper surface of the front bumper 14.

The first gas passage holes 23 include either or both of first discharge holes 23a and first suction holes 23b. The first discharge holes 23a are coupled to the positive pressure source 21a by the positive pressure pipe 22a, and the first suction holes 23b are coupled to the negative pressure source 21b via the negative pressure pipe 22b. In other words, the first discharge holes 23a may be formed in the lower wall surface 10A of the front grille 10, or the first suction holes 23b may be formed in the lower wall surface 10A of the front grille 10. Alternatively, both the first discharge holes 23a and the first suction holes 23b may be formed in the lower wall surface 10A of the front grille 10.

In addition, in the lower wall surface 10A of the front grille 10, the first discharge holes 23a and the first suction holes 23b may be provided such that, for example, a discharge-hole region in which discharge holes are densely formed and a suction-hole region in which suction holes are densely formed are separately formed. Alternatively, for example, the first discharge holes 23a and the first suction holes 23b may be provided in such a manner as to be alternately arranged.

As described above, in the present embodiment, the first gas passage holes 23 are formed as through holes in the lower wall surface 10A of the front grille 10, and the above-mentioned pipes 22 are coupled to these through holes, so that the through holes are coupled to the driving source 21 disposed in the internal chamber or the like. Thus, the control device 50 can perform, by controlling the driving source 21, one or more of control for discharging a gas through the first gas passage holes 23, which are formed in the lower wall surface 10A of the front grille 10, and control for drawing in a gas through the first gas passage holes 23.

As illustrated in FIG. 3 and the like, the air inflow adjustment mechanism 20 of the present embodiment may further have second gas passage holes 24 that are formed in an upper wall surface 10B of the front grille 10 provided with the above-mentioned outside-air intake 11. The second gas passage holes 24 are coupled to the above-mentioned driving source 21 (one or more of the positive pressure source 21a and the negative pressure source 21b) by the above-mentioned various pipes 22.

In one example, the second gas passage holes 24 include either or both of second discharge holes 24a and second suction holes 24b. The second discharge holes 24a are coupled to the positive pressure source 21a by the positive pressure pipe 22a, and the second suction holes 24b are coupled to the negative pressure source 21b by the negative pressure pipe 22b. In other words, the second discharge holes 24a may be formed in the upper wall surface 10B of the front grille 10, or the second suction holes 24b may be formed in the upper wall surface 10B of the front grille 10. Alternatively, both the second discharge holes 24a and the second suction holes 24b may be formed in the upper wall surface 10B of the front grille 10.

In addition, in the upper wall surface 10B of the front grille 10, the second discharge holes 24a and the second suction holes 24b may be provided such that, for example, the above-mentioned discharge-hole region and the above-mentioned suction-hole region are separately formed. Alternatively, for example, the second discharge holes 24a and the second suction holes 24b may be provided in such a manner as to be alternately arranged.

As described above, in the present embodiment, the second gas passage holes 24 are formed as through holes in the upper wall surface 10B of the front grille 10, and the above-mentioned pipes 22 are coupled to these through holes, so that the through holes are coupled to the driving source 21 disposed in the internal chamber. Thus, the control device 50 can perform, by controlling the driving source 21, one or more of control for discharging a gas through the second gas passage holes 24, which are formed in the upper wall surface 10B of the front grille 10, and control for drawing in a gas through the second gas passage holes 24.

Also referring to FIG. 1 and the like, it is understood that the air inflow adjustment mechanism 20 of the present embodiment may have third gas passage holes 25 that are formed in one or more of side wall surfaces 10C and 10D of the front grille 10 provided with the above-mentioned outside-air intake 11. The third gas passage holes 25 are coupled to the above-mentioned driving source 21 (one or more of the positive pressure source 21a and the negative pressure source 21b) by the above-mentioned various pipes 22.

In one example, the third gas passage holes 25 include either or both of third discharge holes 25a and third suction holes 25b. The third discharge holes 25a are coupled to the positive pressure source 21a by the positive pressure pipe 22a, and the third suction holes 25b are coupled to the negative pressure source 21b by the negative pressure pipe 22b. In other words, the third discharge holes 25a may be formed in one or more of the side wall surfaces 10C and 10D of the front grille 10, or the third suction holes 25b may be formed in one or more of the side wall surfaces 10C and 10D of the front grille 10. Alternatively, both the third discharge holes 25a and the third suction holes 25b may be formed in one or more of the side wall surfaces 10C and 10D of the front grille 10. In addition, in the side wall surfaces 10C and 10D of the front grille 10, the third discharge holes 25a and the third suction holes 25b may be provided such that, for example, a discharge-hole region and a suction-hole region are separately formed. Alternatively, for example, the third discharge holes 25a and the third suction holes 25b may be provided in such a manner as to be alternately arranged.

As described above, in the present embodiment, the third gas passage holes 25 are formed as through holes in one or more of the side wall surfaces 10C and 10D of the front grille 10, and the above-mentioned pipes 22 are coupled to these through holes, so that the through holes are coupled to the driving source 21 disposed in the internal chamber.

Thus, the control device 50 can perform, by controlling the driving source 21, one or more of control for discharging a gas through the third gas passage holes 25, which are formed in one or more of the side wall surfaces 10C and 10D of the front grille 10, and control for drawing in a gas through the third gas passage holes 25.

[Reduction in Flow Rate of Running Wind Flowing Through Outside-Air Intake and Control for Drawing Running Wind into Outside-Air Intake]

Control for reducing the flow rate of the running wind flowing into the outside-air intake 11 of the vehicle 100 in the present embodiment and control for drawing in the running wind through the outside-air intake 11 will now be described with reference to FIG. 4 and FIG. 5.

Figure 4:
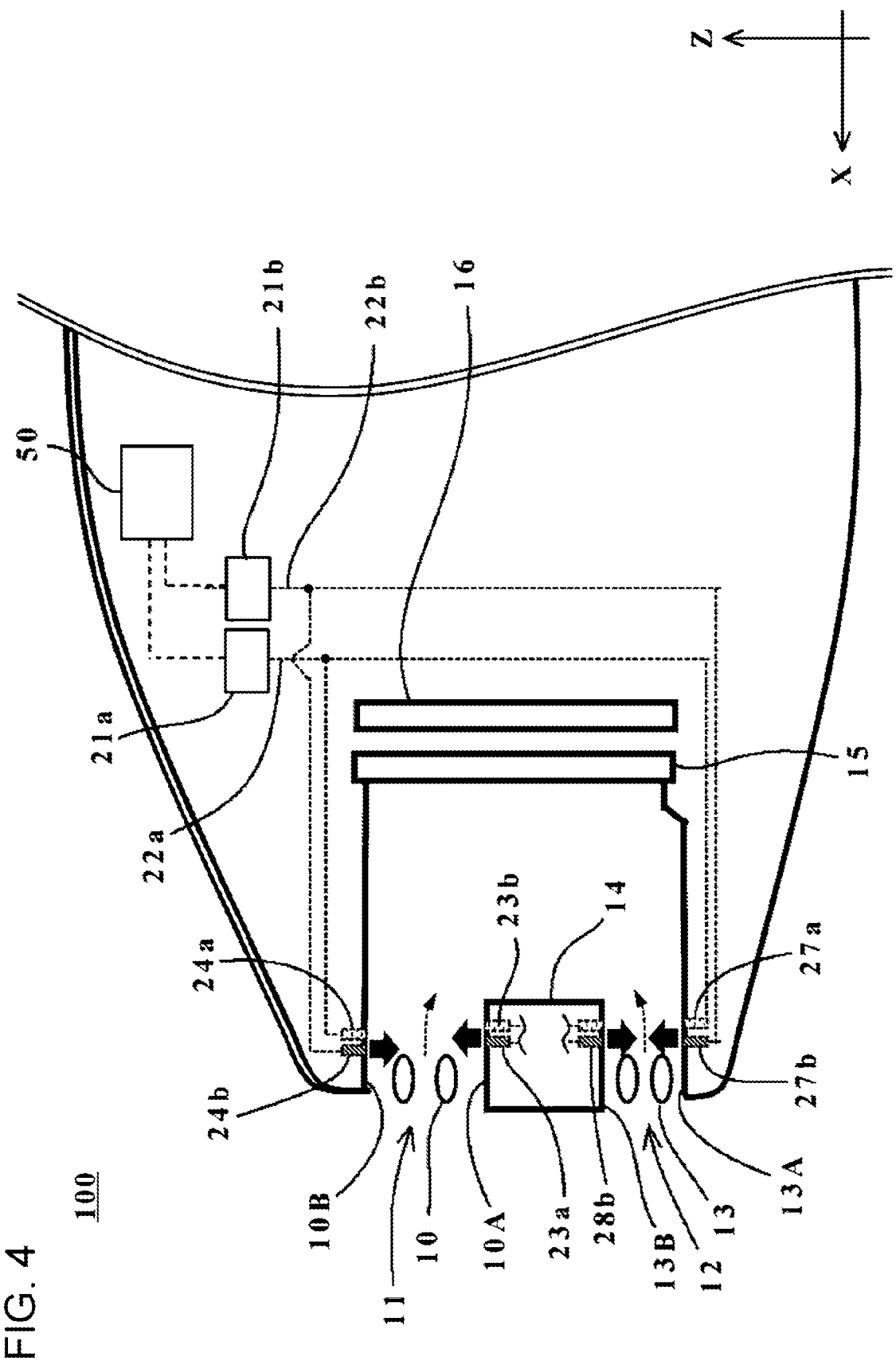
FIG. 4 is a schematic diagram illustrating the air inflow adjustment mechanism that performs control for reducing the flow rate of running wind flowing through an outside-air intake.

FIG. 4 illustrates a state where the flow rate of the running wind that flows into the outside-air intake 11 when the vehicle 100 runs is reduced by the air inflow adjustment mechanism 20. It is understood from FIG. 4 that the control device 50 can perform, by driving the positive pressure source 21a of the driving source 21, which is included in the air inflow adjustment mechanism 20, control for discharging a gas (compressed air or the like) from the first discharge holes 23a and the second discharge holes 24a that are coupled to the positive pressure source 21a.

This enables the gas to be discharged from the lower wall surface 10A and the upper wall surface 10B of the front grille 10, so that a boundary layer in the vicinity of the walls can be developed, and the outside-air intake 11 formed in the front grille 10 is blocked (closed) by the discharged gas flow. In this manner, in the present embodiment, the gas is discharged from one or more gas passage holes, so that the flow rate of the running wind that flows into the internal chamber of the vehicle 100 through the outside-air intake 11 is reduced.

Note that, although FIG. 4 illustrates the case where the gas is discharged from both the first gas passage holes 23 (first discharge holes 23a) and the second gas passage holes 24 (second discharge holes 24a), the way in which the gas is discharged is not limited to this case. The gas may be discharged from either one of the first discharge holes 23a and the second discharge holes 24a, or the gas may be simultaneously discharged from these gas passage holes and also from the third gas passage holes 25 (third discharge holes 25a) formed in one or more of the above-mentioned side wall surfaces 10C and 10D of the front grille 10.

Figure 5:
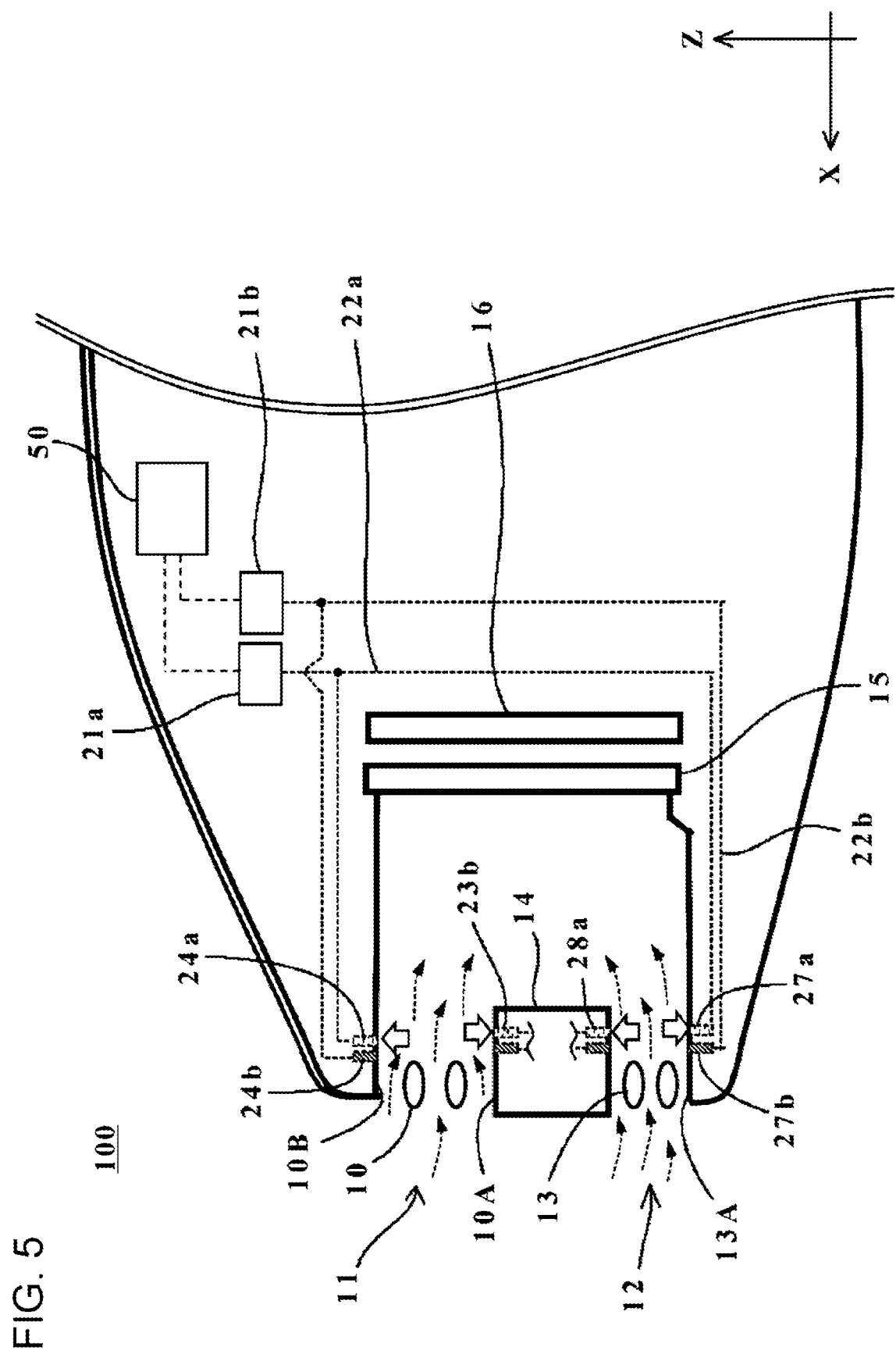
FIG. 5 is a schematic diagram illustrating the air inflow adjustment mechanism that performs control for taking in the running wind through the outside-air intake.

In contrast, FIG. 5 illustrates a state where the running wind is caused by the air inflow adjustment mechanism 20 to be drawn into the outside-air intake 11. It is understood from FIG. 5 that the control device 50 can perform, by driving the negative pressure source 21b of the driving source 21, which is included in the air inflow adjustment mechanism 20, control for drawing in a gas in the front grille 10 through the first suction holes 23b and the second suction holes 24b that are coupled to the negative pressure source 21b.

As a result, the gas is drawn in from the lower wall surface 10A and the upper wall surface 10B of the front grille 10, so that the resistance is reduced by sucking in a boundary layer in the vicinity of the walls, and the pressure in the front grille 10 becomes a relatively negative pressure. This provides an effect in which the surrounding air flows into the negative pressure region. In this case, while the vehicle 100 is running, the air in front of the vehicle 100 is relatively caused to flow into the front grille 10, and a larger amount of the air is drawn into the outside-air intake 11 from the outside of the vehicle 100.

Note that, although FIG. 5 illustrates the case where the gas is drawn in from both the first gas passage holes 23 (first suction holes 23b) and the second gas passage holes 24 (second suction holes 24b), the way in which the gas is drawn in is not limited to this case. The gas may be drawn in from either one of the first suction holes 23b and the second suction holes 24b, or the gas may be simultaneously drawn in from these gas passage holes and also from the third gas passage holes 25 (third suction holes 25b) formed in one or more of the above-mentioned side wall surfaces 10C and 10D of the front grille 10.

<Air Inflow Adjustment Method Using Air Inflow Adjustment Mechanism 20>

Figure 6:
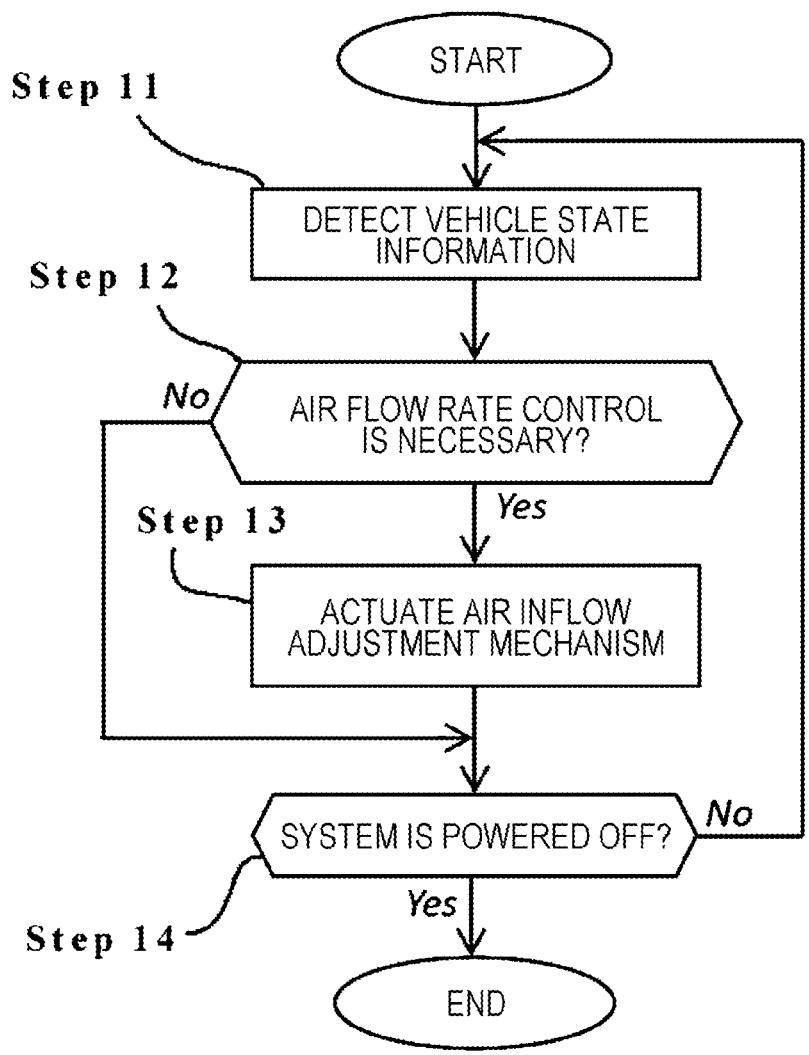
FIG. 6 is a flowchart illustrating an air inflow adjustment method of the embodiment.

An air inflow adjustment method through the outside-air intake 11 of the front grille 10 in the present embodiment will now be described also with reference to FIG. 6. Note that the air inflow adjustment method that will be described below is performed by the above-mentioned control device 50 capable of executing a program describing an operation that will be described below.

First, in step 11, a vehicle state information regarding the vehicle 100 is detected by a known vehicle state sensor, such as a speed sensor or an acceleration sensor. Here, an example of the vehicle state information that can be obtained by the vehicle state sensor installed in the vehicle 100 may be at least one selected from the group consisting of the speed of the vehicle 100, the acceleration of the vehicle 100, and the temperature of an engine cooling water, and so forth.

Note that, after step 11, information regarding the environment surrounding the vehicle 100 may be detected by a known surrounding environment sensor, such as an outside air temperature sensor. The control device 50 may cause, by taking the above-mentioned vehicle state information and the detected surrounding environment information into consideration, the air inflow adjustment mechanism 20 to perform air flow rate control that will be described later. Here, an example of the surrounding environment that can be obtained by the in-vehicle surrounding environment sensor may be at least one selected from the group consisting of the temperature of the outside air around the vehicle 100, the wind speed around the vehicle 100, the altitude of the vehicle 100, the positional information of the vehicle 100, the topographical information around the vehicle 100, and so forth. The positional information of the vehicle 100 may be obtained by, for example, a known sensor that can receive positional information from a known positioning system, such as the global positioning system (GPS) that is installed in the vehicle 100. The topographical information may be obtained from, for example, a navigation system that is installed in the vehicle 100.

Next, in step 12, it is determined whether the above-mentioned air flow rate control through the outside-air intake 11 is to be performed by the air inflow adjustment mechanism 20. In other words, for example, when the temperature of the outside air obtained the above-mentioned outside air temperature sensor is a predetermined temperature or lower, the control device 50 may determine that the air flow rate control is to be performed by the air inflow adjustment mechanism 20. In addition, when the temperature of an engine cooling water obtained by the above-mentioned vehicle state sensor is a predetermined temperature or higher, the control device 50 may determine that the air flow rate control is to be performed by the air inflow adjustment mechanism 20.

When it is determined that the air flow rate control is not necessary in step 12, it is determined in step 14 whether a system of the vehicle 100 is powered off. When the system of the vehicle 100 is powered off, the process is terminated, and when the system of the vehicle 100 is not powered off, the process returns to step 11, and the above-described operation is repeated.

When it is determined in step 12 that the air flow rate control is to be performed, the above-mentioned air inflow adjustment mechanism 20 is caused in step 13 to perform the air flow rate control through the outside-air intake 11. In one example, when it is determined in step 12 that a larger amount of the outside air is to be taken in through the outside-air intake 11, as illustrated in FIG. 5, the negative pressure source 21b of the driving source 21 included in the air inflow adjustment mechanism 20 is driven such that the gas is drawn in through the suction holes, such as the first suction holes 23b and the second suction holes 24b, so that the pressure in the front grille 10 becomes a relatively negative pressure.

In this manner, the gas is drawn in from the wall surfaces (one or more of the lower wall surface 10A, the upper wall surface 10B, the side wall surface 10C and the side wall surface 10D) of the front grille 10 through the one or more suction holes, so that the outside air in front of the vehicle 100 is caused to flow into the front grille 10 and is drawn into the front accommodation space AR. This can facilitate, for example, heat exchange in the air-conditioning condenser 15 or the radiator 16.

For example, when it is determined in step 12 that the flow of the outside air through the outside-air intake 11 is to be blocked, as illustrated in FIG. 4, the positive pressure source 21a of the driving source 21 included in the air inflow adjustment mechanism 20 is driven in step 12 such that the gas is discharged from the discharge holes, such as the first discharge holes 23a and the second discharge holes 24a, so that the outside-air intake 11 is blocked by the gas flow.

In this manner, the gas is discharged from the above-mentioned wall surfaces of the front grille 10 through the one or more suction holes, so that the outside air that flows from the front of the vehicle 100 into the outside-air intake 11 is blocked, and that possibility that the internal chamber (front accommodation space AR) will be excessively cooled can be reduced.

According to the air inflow adjustment mechanism 20 and the air inflow adjustment method in the present embodiment, which have been described above, the flow rate of the air through the outside-air intake 11 can be increased by sucking the air boundary layer in the vicinity of the walls near the above-mentioned wall surfaces of the front grille 10. In addition, according to the air inflow adjustment mechanism 20 and the air inflow adjustment method in the present embodiment, the boundary layer in the vicinity of the walls can be developed by discharging the gas from the wall surfaces of the front grille 10 so as to reduce the flow rate of the air through the outside-air intake 11, and a drag coefficient (Cd), that is, air resistance, can be improved.

In particular, according to the vehicle 100 in the present embodiment that includes the air inflow adjustment mechanism 20, compared with a shutter mechanism used for a front grille in the related art, a duct can be reduced in size and weight, and a larger amount of the outside air can be caused to actively flow into the outside-air intake 11 by, for example, generating a negative pressure state while controlling the above-mentioned boundary layer.

Note that, in the present embodiment, although the gas passage holes through which the gas can be discharged or drawn in are formed in peripheral portions of the front grille 10, the gas passage holes may also be formed in a lower wall surface 13A or an upper wall surface 13B of the lower grille 13 provided in the lower ventilation port 12.

In other words, the air inflow adjustment mechanism 20 of the present embodiment may further have either or both of fourth gas passage holes 27 that are formed in the lower wall surface 13A the lower grille 13 and fifth gas passage holes 28 that are formed in the upper wall surface 13B the lower grille 13. Note that the lower grille 13 may be formed as a separate member at a lower portion of the above-mentioned front bumper 14 as illustrated in the drawings or may be formed in an opening that is formed in the front bumper 14.

The fourth gas passage holes 27 and the fifth gas passage holes 28 may be coupled to the driving source 21 by the above-mentioned pipes 22. This enables the gas to be discharged to the lower ventilation port 12 and drawn in from the lower ventilation port 12 through the fourth gas passage holes 27 and the fifth gas passage holes 28. In the present embodiment, although the case has been described in which the gas passage holes are formed in the upper and lower wall surfaces 13B and 13A of the lower grille 13, a gas passage hole through which the gas can be discharged or drawn in may be formed in a side wall surface of the lower grille 13.

Although the embodiment of the disclosure has been described above with reference to the accompanying drawings, the disclosure is not limited to the embodiment. It is obvious that those skilled in the art will attempt to make further modifications and corrections to the above-described embodiment, and it is naturally understood that such modifications and corrections are also within the technical scope of the disclosure.

Figure 7:
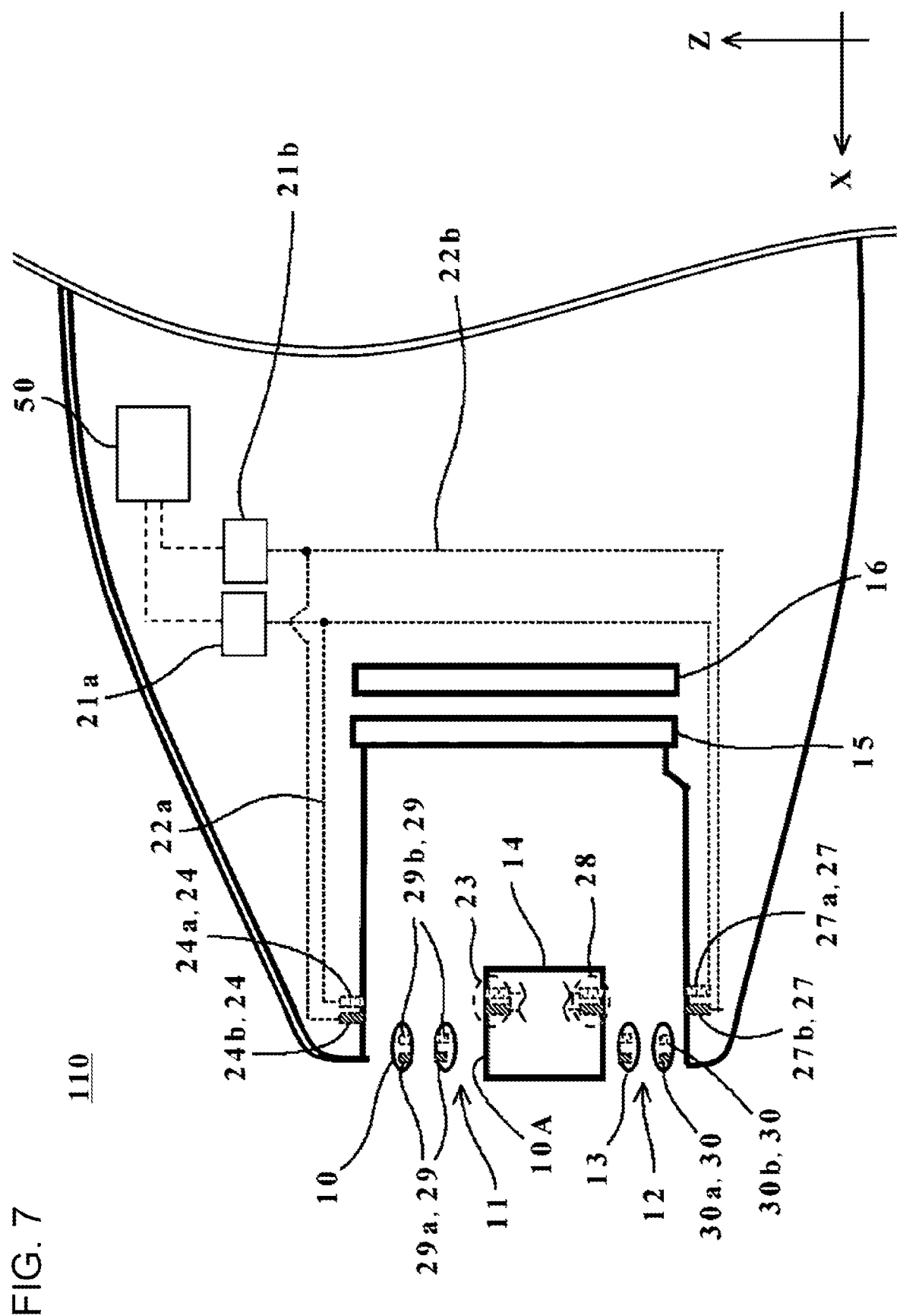
FIG. 7 is a schematic diagram illustrating a vehicle according to a modification that includes the air inflow adjustment mechanism.

FIG. 7 is a schematic diagram illustrating a vehicle 110 according to a modification that includes the air inflow adjustment mechanism 20.

It is understood from FIG. 7 that, compared with the air inflow adjustment mechanism 20 of the above-described embodiment, the air inflow adjustment mechanism 20 according to the modification has the following principal features: (A) gas passage holes (hereinafter also referred to as "grille holes") are also formed in a surface (one or more of the top surface and the bottom surface) of the grille, (B) the gas passage holes formed in the grille are coupled to the above-mentioned driving source 21 by a known pipe, and (C) the control device 50 is configured to be capable of performing control for discharging or drawing in a gas through the gas passage holes formed in the grille.

In other words, the air inflow adjustment mechanism 20 according to the modification may have grille holes 29 that are formed in a surface (one or more of the top surface and the bottom surface) of the front grille 10 provide with the above-mentioned outside-air intake 11. The grille holes 29 are coupled to the above-mentioned driving source 21 (one or more of the positive pressure source 21a and the negative pressure source 21b) by the above-mentioned various pipes 22. Thus, the control device 50 may perform, by controlling the driving source 21, one or more of control for discharging the gas through the grille holes 29, which are formed in the surface of the front grille 10, and control for drawing in the gas through the grille holes 29.

In one example, the grille holes 29 includes either or both of grille discharge holes 29a and grille suction holes 29b. The grille discharge holes 29a are coupled to the positive pressure source 21a via the positive pressure pipe 22a, and the grille suction holes 29b are coupled to the negative pressure source 21b by the negative pressure pipe 22b. In other words, the grille discharge holes 29a may be formed in the top surface or the bottom surface of the front grille 10, or the grille suction holes 29b may be formed in the top surface or the bottom surface of the front grille 10. Alternatively, both the grille discharge holes 29a and the grille suction holes 29b may be formed in the top surface or the bottom surface of the front grille 10.

In one or more of the top surface and the bottom surface of the front grille 10, the grille discharge holes 29a and the grille suction holes 29*b* may be provided such that, for example, a discharge-hole region and a suction-hole region are separately formed. Alternatively, for example, the grille discharge holes 29*a* and the grille suction holes 29*b* may be provided in such a manner as to be alternately arranged.

As illustrated in FIG. 7, in the air inflow adjustment mechanism 20 according to the modification, gas passage holes (lower grille holes 30) through which the gas can be discharged or drawn in may be further formed in a surface (one or more of the top surface and the bottom surface) of the lower grille 13 provided in the lower ventilation port 12. This enables the gas to be discharged to the lower ventilation port 12 and drawn in from the lower ventilation port 12 through the lower grille holes 30 (including either or both of discharge holes 30*a* and the suction holes 30*b*).

Note that, in the embodiment and the modification, which have been described above, control for discharging the gas through the first gas passage holes 23 to the fifth gas passage holes 28 and the gas passage holes formed in the grille and control for drawing in the gas through the first gas passage holes 23 to the fifth gas passage holes 28 and the gas passage holes formed in the grille may be performed in such a manner that at least part of these control operations is performed at the same time or in parallel. Alternatively, these control operations may be performed independently of each other by, for example, using driving sources 21.

According to the disclosure, the flow rate of the air that flows into an outside-air intake is adjusted by using a gas, and thus, the costs can be reduced with a simpler structure while an increase in the weight of the front of a vehicle is suppressed.

The invention claimed is:

1. A vehicle comprising:
an outside-air intake configured to take outside air into an internal chamber of the vehicle; and
an air inflow adjustment mechanism configured to adjust a flow rate of air that is to flow into the outside-air intake, the air inflow adjustment mechanism being disposed at the outside-air intake and comprising one or both of a positive pressure source configured to perform discharge of gas and a negative pressure source configured to perform suction of gas.

2. The vehicle according to claim 1,
wherein the air inflow adjustment mechanism has first gas passage holes that are disposed in a lower wall surface of a front grille provided with the outside-air intake, and
wherein one or both of the positive pressure source and the negative pressure source are coupled to the first gas passage holes.

3. The vehicle according to claim 1,
wherein the air inflow adjustment mechanism has second gas passage holes that are disposed in an upper wall surface of a front grille provided with the outside-air intake, and
wherein one or both of the positive pressure source and the negative pressure source are coupled to the second gas passage holes.

4. The vehicle according to claim 1,
wherein the air inflow adjustment mechanism has third gas passage holes that are disposed in a side wall surface of a front grille provided with the outside-air intake, and
wherein one or both of the positive pressure source and the negative pressure source are coupled to the third gas passage holes.

5. The vehicle according to claim 1,
wherein the air inflow adjustment mechanism has grille holes that are formed in a surface of a front grille provided with the outside-air intake, and
wherein one or both of the positive pressure source and the negative pressure source are coupled to the grille holes.

\* \* \* \* \*